US012649399B2

(12) United States Patent
Demleitner et al.

(10) Patent No.: US 12,649,399 B2
(45) Date of Patent: Jun. 9, 2026

(54) AUTOMATIC SEAT INCLINATION ADJUSTMENT (SNV) FOR VEHICLE SEATS

(71) Applicant: GRAMMER Aktiengesellschaft, Ursensollen (DE)

(72) Inventors: Berthold Demleitner, Freudenberg (DE); Thomas Haller, Ursensollen (DE)

(73) Assignee: GRAMMER AKTIENGESELLSCHAFT, Ursensollen (DE)

( * ) Notice: Subject to any disclaimer, the term of this patent is extended or adjusted under 35 U.S.C. 154(b) by 0 days.

(21) Appl. No.: 18/823,980

(22) Filed: Sep. 4, 2024

(65) Prior Publication Data

US 2025/0083583 A1    Mar. 13, 2025

(30) Foreign Application Priority Data

Sep. 13, 2023    (DE) ..................... 10 2023 124 756.5

(51) Int. Cl.
*B60N 2/90*          (2018.01)
*B60N 2/02*          (2006.01)

(52) U.S. Cl.
CPC ............. *B60N 2/914* (2018.02); *B60N 2/026* (2023.08); *B60N 2002/0212* (2013.01)

(58) Field of Classification Search
CPC .................... B60N 2/914; B60N 2/026; B60N 2002/0212; B60N 2/0268; B60N 2/39; B60N 2/10; B60N 2/0224; B60N 2/0272
See application file for complete search history.

(56) References Cited

U.S. PATENT DOCUMENTS

| | | | | |
|---|---|---|---|---|
| 6,398,303 B1* | 6/2002 | Herrmann | ............ | B60N 2/1878 297/314 |
| 2008/0100110 A1 | 5/2008 | Hwang | | |
| 2014/0097661 A1* | 4/2014 | Loher | .................... | B60N 2/914 297/452.41 |
| 2019/0152348 A1* | 5/2019 | Ishida | ........................ | B60N 2/99 |
| 2022/0072985 A1* | 3/2022 | Schneider | .............. | B60N 2/976 |
| 2023/0077600 A1* | 3/2023 | Hirao | ................... | B60N 2/0025 297/284.6 |
| 2023/0311720 A1* | 10/2023 | Tanabe | ................... | B60N 2/026 296/65.01 |

FOREIGN PATENT DOCUMENTS

| | | |
|---|---|---|
| DE | 102012109597 | 4/2014 |
| DE | 102018128505 | 5/2019 |

(Continued)

OTHER PUBLICATIONS

Official Action for Germany Patent Application No. 102023124756. 5, dated Apr. 23, 2024, 4 pages.

(Continued)

*Primary Examiner* — Adam R Mott
*Assistant Examiner* — Ricardo I Viscarra
(74) *Attorney, Agent, or Firm* — Sheridan Ross P.C.

(57)                    ABSTRACT

The invention relates to a vehicle seat for automatic inclination compensation, with a seat part and a backrest, wherein a fluid chamber unit with at least two flexibly designed fluid chambers is arranged between at least one seat plate part of the seat part and a thereabove arranged seat cushion part of the seat part.

9 Claims, 6 Drawing Sheets

(56)         References Cited

FOREIGN PATENT DOCUMENTS

| EP | 4098151 | 12/2022 |
| JP | S59-75842 | 4/1984 |
| JP | 2017-132364 | 8/2017 |

OTHER PUBLICATIONS

Official Action for Germany Patent Application No. 102023124756.
5, dated Jun. 17, 2025, 3 pages.
Extended European Search Report for Europe Patent Application
No. 24197701.6, dated Jan. 24, 2025, 24 pages.

* cited by examiner

AUTOMATIC SEAT INCLINATION ADJUSTMENT (SNV) FOR VEHICLE SEATS

CROSS REFERENCE TO RELATED APPLICATION

This application claims the benefit of German Patent Application No. 10 2023 124 756.5, filed Sep. 13, 2023, the entire contents of which are hereby incorporated herein by reference.

FIELD

The invention relates to a vehicle seat for the automatic inclination compensation with a seat part and a backrest part.

BACKGROUND

With commercial vehicles, such as tractors, there is often the problem that they are operated at times in a sideways or inclined position, for example to pull a plough behind them on the field. When ploughing the field, the problem arises that one half of the tractor's wheels is in the area of the already ploughed field, while the other half of the wheels is moving on the unploughed soil. This results in a sideways inclined position or slanted position of the tractor and thus also of the vehicle seat.

If a vehicle seat is slanted or in an inclined position for a long period of time, this can put strain on the back and spine of the vehicle user, resulting in the risk of spinal damage in the working environment of tractors and construction machinery. In the case of construction machinery, the problem also arises very often that these machines have to be operated in a slanted position during road construction work. This also means that the seat user sits in a slanted position on the vehicle seat and tries to compensate for this slanted position with the help of his or her spine.

This results in a misalignment of the spine from top to bottom in relation to the position of the pelvis. Under certain circumstances, this can even lead to curvature of the spine, known as scoliosis. This is because the human body tends to want to keep its head and therefore its eyes horizontal, even if the pelvis at the end of the spine is tilted.

Scoliosis is classified as mild if the angle of curvature of the spine is more than 10° but not more than 40°. Very often, such values are around 20°. Although scoliosis of this kind can be treated by consistent back exercises, such exercises must be carried out consistently and regularly, which is often not possible due to the daily work environment on the field or on the construction site.

SUMMARY

The invention is therefore intended to provide a vehicle seat with an automatic inclination compensation system and a seat part that can easily provide the seat user with a compensatory position when the vehicle seat is in an inclined or slanted position.

The core idea of the invention is that so-called fluid chambers are used in the area of the seat part of a vehicle seat for automatic inclination compensation with a seat part and a backrest, whereby the seat part and backrest are to be considered independently of each other. This means that only the seat part and not the backrest part is changed for a compensating movement.

For this purpose, a fluid chamber unit with at least two flexibly designed fluid chambers is arranged between at least one seat plate part of the seat part and a seat cushion part of the seat part arranged above it, wherein, with reference to a centre axis extending in the direction of the seat, a first half of the fluid chamber is arranged on the left-hand side and a second half of the fluid chamber is arranged on the right-hand side the centre axis and the first and second halves of the fluid chambers can be filled or emptied by means of a control device depending on a detected lateral inclined position of the seat part in such a way that a seat user automatically experiences a compensatory position in the seat area to the inclined position independently of a backrest position.

This involves a lateral inclination of the seat part when viewed in the direction of travel. The intention is not to realign the entire vehicle seat, but merely to change the inclination of the seat part in order to achieve such a compensatory position. The decisive factor here is the measurement of an inclination sensor or its measurement data, which are used to control a control device with the help of this measurement data in such a way that it fills or empties the left-hand fluid chamber and the right-hand fluid chamber in such a way that an opposite compensating inclination of the seat part in relation to the inclined position, which results from the vehicle and/or the vehicle seat being positioned at an angle, is achieved.

If, for example, the vehicle is travelling in the direction of travel on the left-hand side of the furrow of the already cultivated part of a field, the tractor will incline to the left. As a result, the vehicle seat will also incline to the left. Based on the measurement signals sent by the inclination sensor, the control device will ensure that more fluid is pumped into the left fluid chamber, while fluid is removed from the right fluid chamber, provided that there is still fluid in it. This results in the seat part inclining in the opposite direction to the inclined position of the vehicle or vehicle seat, thus creating a certain compensatory position. This enables the driver or seat user to avoid the risk of spinal curvature in the form of scoliosis.

The seat part is operated in its inclined position independently of the position of the backrest due to the fluid chamber functions.

In order to control such inflows and outflows of fluids to the individual fluid chambers, not only does the control device have a CPU, but additional valves or valve devices are also arranged, which are controlled by the control device and enable a controlled inflow and outflow of the fluid.

A inclination sensor unit attached to the vehicle seat is used to measure the degree of the current lateral inclination of the vehicle seat and/or the vehicle, and then to send a determined inclination measurement signal as data transmission to the control device.

The fluid chambers can advantageously be air chambers, preferably with a flexible casing material. This makes it easy to quickly inflate or deflate the fluid chamber.

It is preferable to have an air chamber on each side of the centre axis, or a number of individual air chambers that are either connected to each other or can be controlled separately. However, it is important that the air chambers or fluid chambers are arranged in a mirror-symmetrical manner in both halves, i.e. to the left and right of the centre axis, so that a corresponding tilt compensation can take place on both sides, regardless of which side the vehicle is inclined to.

According to a preferred embodiment, at least one first plate element is arranged on the left side and at least one second plate element is arranged on the right side between the fluid chambers and the seat cushion part arranged above them in order to obtain a more stable support surface for the seat user, since no stable sitting position can be achieved with direct contact with an inflated air chamber. Rather, the relatively stiff plate element ensures that a stable surface is created underneath the seat cushion part, even in the extreme case where one air chamber on the left or right is 100% full, whereas the air chamber on the other side is completely empty.

In a preferred embodiment, the plate elements have raised and recessed areas to increase seating comfort. This means that no rigid plate can be felt under the seat cushion part, which is completely flat. Rather, recesses for the pelvic bone areas and for accommodating other buttock shapes can contribute to increased seating comfort.

According to a preferred embodiment, the first and second plate elements are mounted so that they can be swivelled up and down by means of a first swivelling axis running along the centre axis of the seat part. This means that the plate elements are suspended so that they can swivel in the centre, so that the greatest distances when swivelling the plate elements up and down take place in their outer area, i.e. at the outermost side areas of the vehicle seat. This is the best way to compensate for the unintentional inclined position of the vehicle seat.

The two plate elements, i.e. the first and second plate elements, can be arranged so that they can swivel independently of each other. This makes it possible, for example, for a left-hand plate element to be swivelled upwards while a right-hand plate element can be swivelled downwards to a greater or lesser extent, regardless of the extent of the swivelling movement of the left-hand plate element. This makes it possible to adjust the inclination of the seat cushion part very individually, in order to respond individually to certain inclined positions of the entire vehicle, which constantly changes its inclined position when driving through a field.

The first and second plate elements preferably each have a surface area on the left and right of the centre axis that is not smaller than the surface area of the fluid chamber arranged below it on the left or right. This means that there is no risk of the fluid chamber exerting a pressure on the seat user through the cushion. Instead, the pressure of an inflated fluid chamber or air chamber is distributed over the plate element, which then passes the pressure or force on to the seat user in an upward direction over the surface area.

Another advantageous design variant provides for a third plate element, which is common to all fluid chambers, to be arranged between the fluid chambers arranged next to each other and the seat cushion part arranged above them, which is mounted in a rocker-like manner so that it can swivel by means of a second swivelling axis running along the centre axis of the seat part.

This means that there are not two plate elements that can swivel separately from each other, but rather a common plate element. The advantage of this is that when one side moves upwards, the other side moves downwards to the same extent. Many seat users find this rocking motion pleasant, as it prevents unwanted compression or overextension of the pelvis due to the plate elements on the left and right sides being at different angles.

In a preferred embodiment, the control device can be activated at predetermined speeds and/or accelerations of the vehicle driver. For example, it may be provided that such a change in the inclination of the seat part is only desired when ploughing. However, when the tractor is on a normal tarred road, such an inclination adjustment or compensation should not take place.

An acceleration sensor or an acceleration sensor device can be used to determine whether the tractor is currently travelling on a road or in the field. Depending on the acceleration values, acceleration signals can be sent to the control device to prevent the tractor from levelling out if it is currently on the road. This also applies to construction vehicles, provided the road is tarred.

Signals from the OPS can also be evaluated to compensate for seat pressure distribution via the side inclination.

Of course, a non-open system can also be used, which is characterised by the fact that no separate pumps are required to supply fluids or air, and that no corresponding valve devices are required. In a closed system, where the individual air or fluid chambers are connected to each other but have no outlet or inlet to the outside to a valve or pump, tilt compensation takes place solely by changing the body weight from one side to the other. This change in body weight occurs automatically when the vehicle and vehicle seat are inclined, as the seat user tends to incline towards the higher half of the seat part, thus shifting more weight to this half of the seat part. This causes the air in this half of the seat or in the air chamber below it to be pushed out and automatically pushed into the air chamber of the other, lower half of the seat. This is also how the inclination is compensated for.

Further designs can be seen in the drawing.

DETAILED DESCRIPTION

Figure 1:
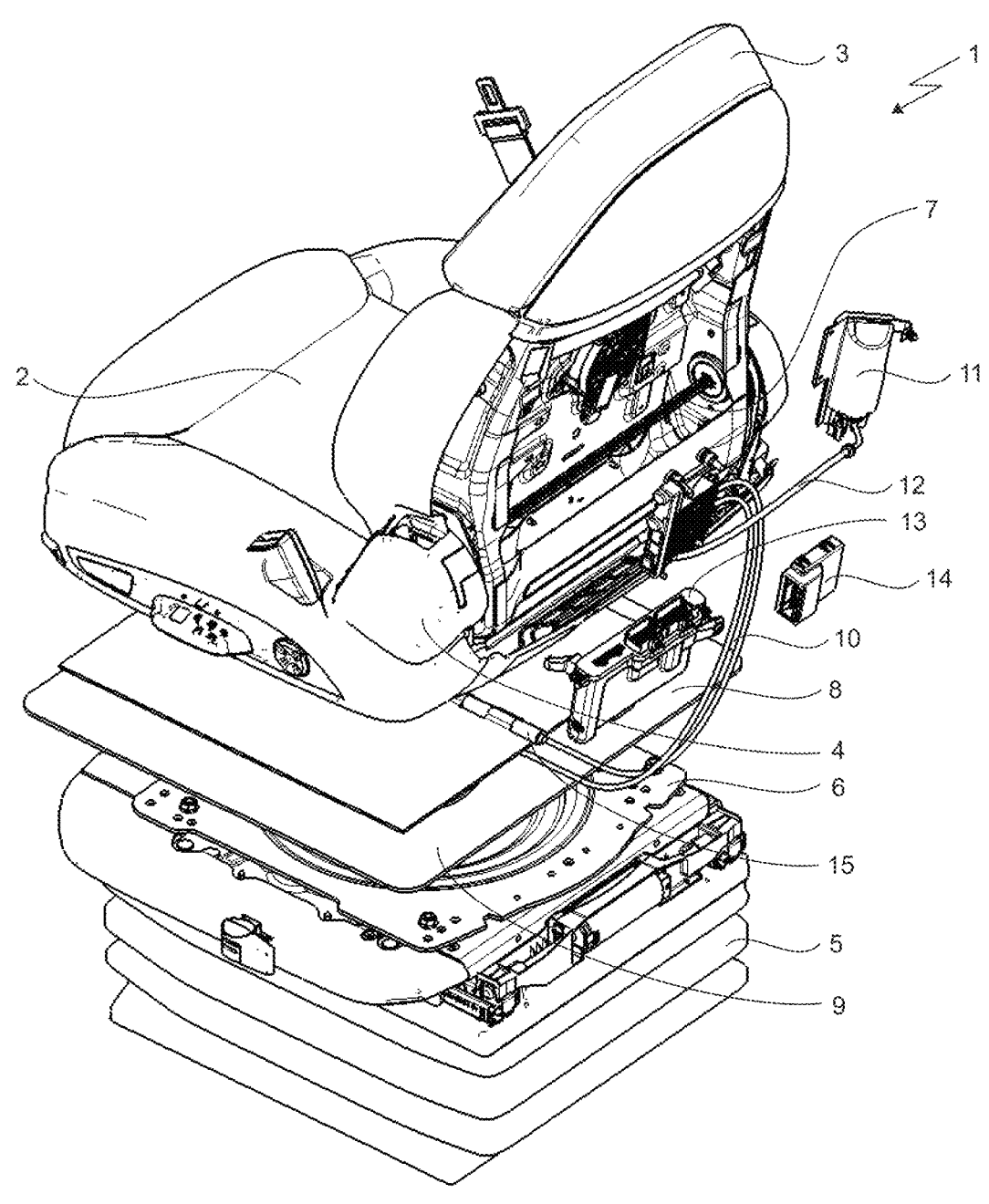
FIG. 1 a schematic perspective view of a vehicle seat according to the present invention.

FIG. 1 shows a rear view of an vehicle seat according to the invention. This vehicle seat 1 has a seat part 2 and a backrest 3.

A swivelling axis 7 can be used to swivel not only the armrests 4 indicated here, but also the backrest 3, whereby it should be noted that the seat part 2 can be swivelled independently of the backrest.

A gaiter 5 in the lower area covers a folding frame not shown in detail here.

A turntable 6, shown here as an example, is used to swivel the upper part of the vehicle seat relative to the lower part.

A lower plate element 8 is arranged below fluid chambers not shown here in more detail and is used to support and bed the fluid chambers downwards.

Figure 2:
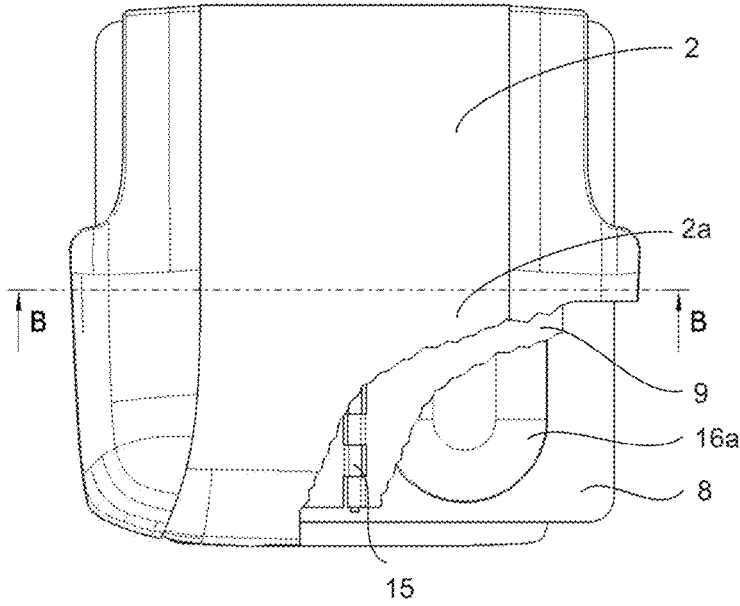
FIG. 2 a top view of a seat part for a vehicle seat according to one embodiment of the invention.

An upper plate element 9 is arranged above the fluid chambers, which are not shown in detail here, and serves to delimit the fluid chambers upwards with respect to the seat cushion part 2a, as shown in FIG. 2.

Air supply and exhaust pipes 10 run from a valve device, which is not shown in detail here, to the air chambers arranged on the left and right sides between the plate elements 9 and 8. An air-conveying pump 11 is connected to the valve device via an air pipe 12, so that an air supply is ensured. A control device 13 for controlling the inclination adjustment of the seat part is described in more detail, as is an inclination sensor or inclination sensor device 14.

An axis 15 is used to arrange a left-hand plate element 9 and a right-hand plate element 9 so that they can be swivelled towards each other.

FIG. 2 shows a top view of the seat part in its structure according to one embodiment of the invention.

The seat part 2 has the seat cushion part 2a. The plate element 9, which has already been described, is arranged below this and in turn separates a left-hand fluid chamber or air chamber 16a from the cushion part 2a.

The plate element 9 is arranged so that it can swivel on the swivelling axis 15, whereby the swivelling axis 15 is aligned along a centre axis 15a of the seat part 2. In the version shown here, the front side of the seat part can be seen at the bottom, whereas the rear side can be seen in the upper area of the image plane.

The seat part shown in FIG. 2 is shown in a cross-sectional view along the arrows B-.-.-B. This can be seen in FIG. 3.

Figure 3:
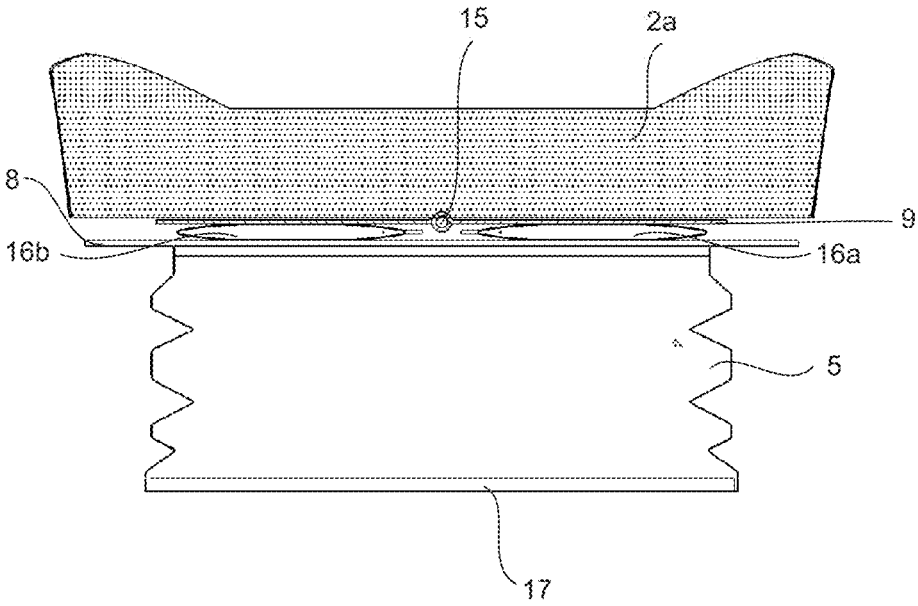
FIG. 3 in a cross-sectional view according to arrow B-.-.-B in FIG. 2, the seat part of the vehicle seat according to the invention.

FIG. 3 shows that an upper plate element 9 is suspended on a swivelling axis 15. The plate element 9 can be designed as a single piece across the entire width of the seat part and swivelled on the swivelling axis 15 like a rocker. However, it can also be in two parts. In the case of a two-part plate element 9, a right-hand plate element 9 is arranged so that it can swivel on the swivelling axis 15. A left-hand plate element 9 is also arranged on the swivelling axis 15. These two plate elements can be swivelled upwards or downwards either independently of each other or in dependence on each other.

A left-hand air chamber 16a and a right-hand air chamber 16b are arranged below the plate element 9 or the plate elements.

The gaiter 5 is supported at the bottom by a base element 17.

The two air chambers 16a and 16b are supported at the bottom by a further plate element 8, so that both air chambers are arranged between the two plate elements 9 and 8.

Figure 4A:
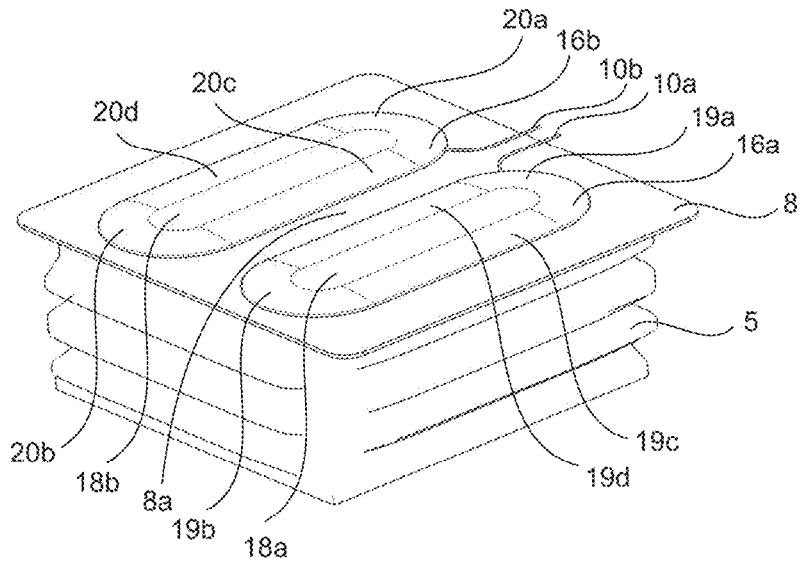
FIG. 4a to 4c in perspective side views, parts of the seat part according to the invention in different assembly phases.
Figure 4B:
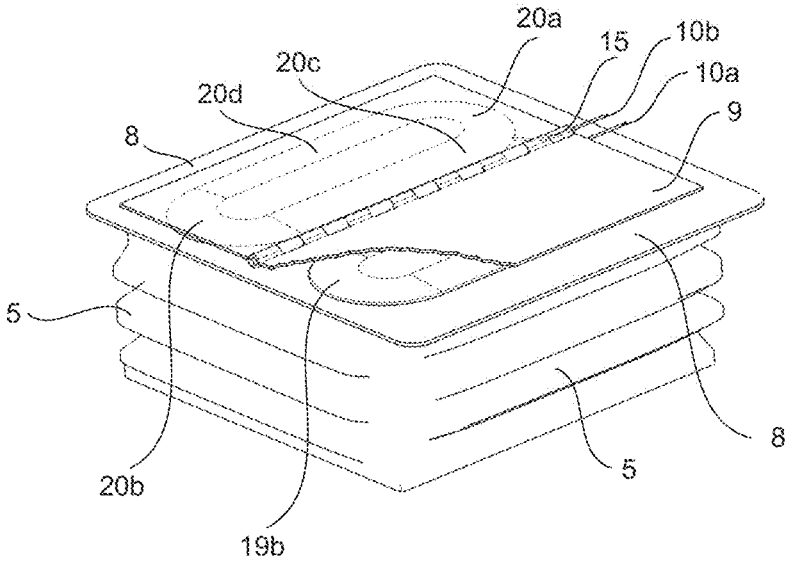
Figure 4C:
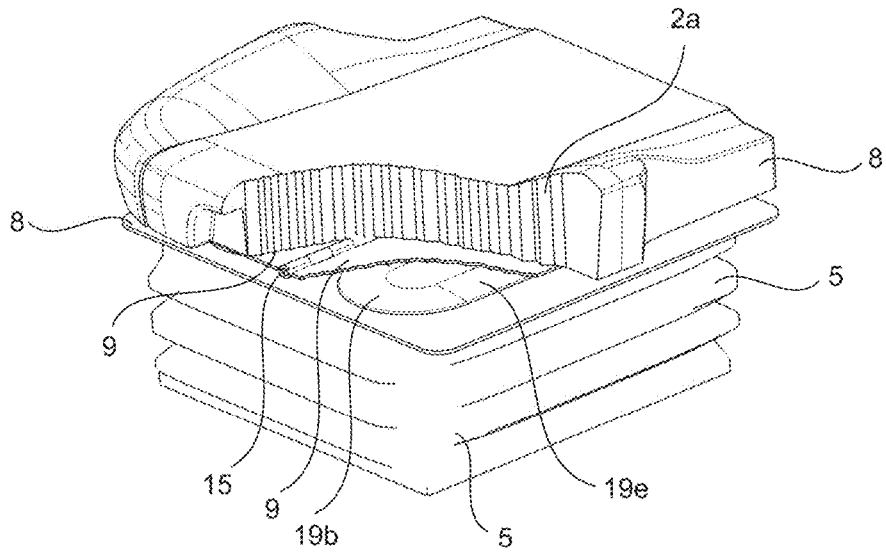

FIGS. 4a to 4c show the seat part in different construction stages in a perspective view. These illustrations show that the seat part is connected on the underside to the circumferential gaiter 5. The lower plate element 8 is arranged so that the air chambers 16a and 16b can be arranged next to each other on it. Both have supply and exhaust air lines 10a and 10b, which, not shown in detail here, are led to a valve device.

The two air chambers 16a and 16b are preferably oval in shape and have a recess 18a and 18b in the centre. This shape of air chamber increases the stability of the seat part and the entire seat surface when the air chambers are inflated.

The air chambers 16a and 16b have different sections. The rear sections 19a and 20a are arched. The front ends 19b and 20b are also arched. Longer sections that connect these arched ends to each other have reference marks 19c, 19d, 20c and 20d. All sections 19a-d and 20a-d can be fluidically connected to each other as intended.

Between the air chambers, there is a section 8a of the lower plate element, which can be used to arrange a swivelling axis arranged above it according to FIG. 4b with the reference mark 15 without damaging the air chambers below it.

In FIG. 4b, the plate element 9 can be seen above the air chambers, which can be swivelled up and down or to the left and right via the swivelling axis 15. If the upper plate element 9 is designed as a single-piece component on the left and right sides, the swivelling axis 15 acts as a centrally arranged swivelling axis for a rocking movement of the plate element 9.

Alternatively, however, the plate element 9 can be designed in two parts, so that there is a left-hand plate element 9 and a right-hand plate element 9, which both meet at the swivelling axis 15 and can be swivelled upwards or downwards independently of each other. This makes it possible to achieve not so much a seesaw-like movement of the plate element 9 as a wing-like movement of the two plate elements 9 to the left and right of the swivelling axis.

In FIG. 4c, the seat cushion part 2 is additionally arranged to the plate element 9. The left and right-hand upward and downward movement of the cushion part 2a is due to the air in the air chambers 19a-d and 20a-d being pumped up and down and the plate elements 9, which are arranged between the cushion part 2a and the air chambers, moving with it.

Figure 5A:
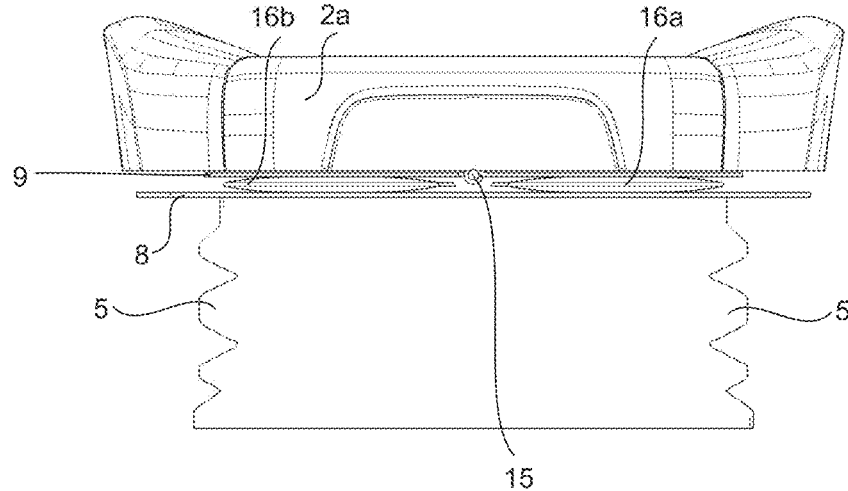
FIG. 5a to 5c a front view of a seat part with the structure according to the invention in different inclination positions according to one embodiment of the invention and FIGS. 6a and 6b a perspective schematic view of a section of the seat part according to a preferred embodiment of the invention with different inclination positions.
Figure 5B:
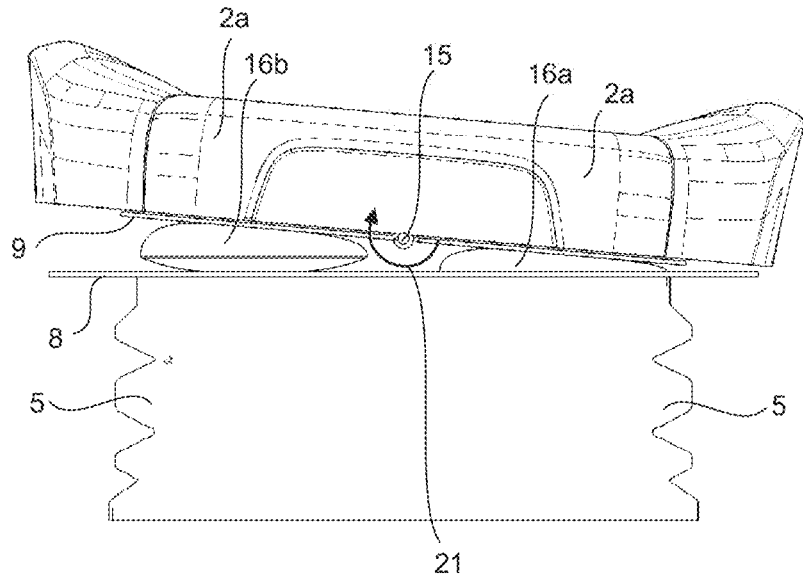
Figure 5C:
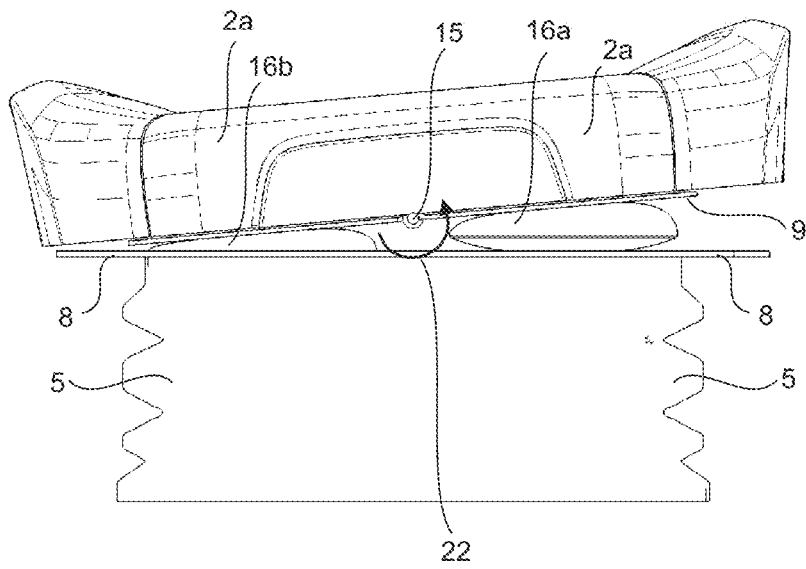

FIGS. 5a, 5b and 5c show the seat part in a front view with different inclined positions or compensation movements. These figures clearly show that seat part 2 in FIG. 5a has not assumed an inclined position. In FIG. 5b, however, the seat part is swivelled to the left, as can be seen from arrow 21. This means that the vehicle is higher on the left side than on the right side. Such an inclination adjustment is caused by the inflation of the air chamber 16b on the right side of the seat part, whereupon the plate element 9 at this point rises and lowers on the left side. This causes the air chamber 16a to release air. Such a process is controlled by the control device, which is not shown in detail here.

FIG. 5c shows the seat part 2 in the position with the opposite inclination. This is indicated by the arrow 22. This means that in this case the air chamber 16a is inflated by means of the control device, since the inclination sensor has detected an inclination of the vehicle and thus of the vehicle seat to the left, viewed in the direction of travel. This means that the vehicle is travelling lower on the left side and that the seat part must therefore be pumped up on the left side in accordance with arrow 22 and must be lowered on the right side by releasing air from air chamber 16b. In this case, plate element 9 is designed as a single piece and therefore performs a rocker-like movement.

Figure 6A:
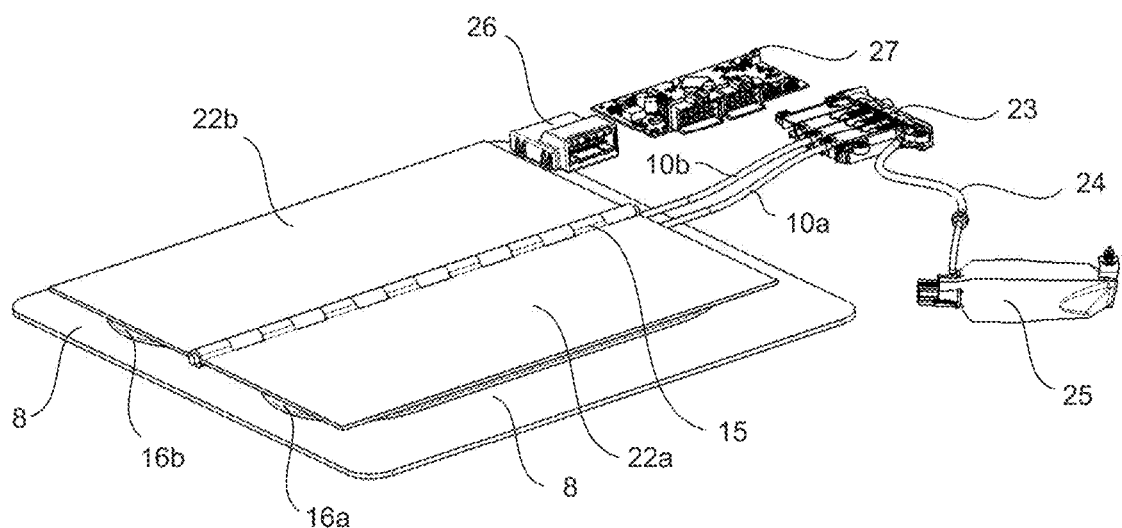
Figure 6B:
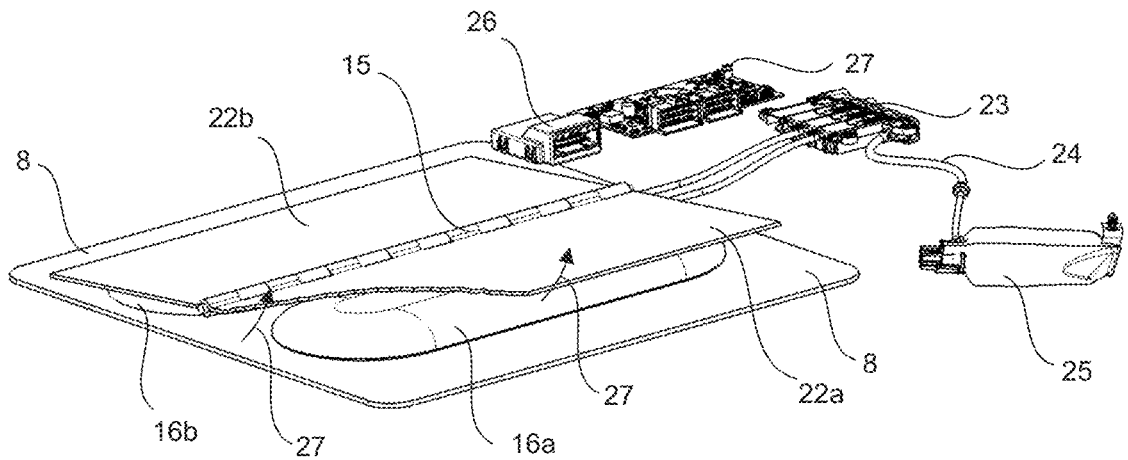

FIGS. 6a and 6b show a schematic representation of the seat part with the associated control unit according to one embodiment of the invention. These FIGS. 6a and 6b differ in their swivelling position. The swivelling position of the upper plate elements 22a and 22b shown in FIG. 6a is intended to show that both plate elements are suspended so that they can swivel on one side and can move independently of each other upwards or downwards. An upward swivelling movement 27 of the left-hand plate element 22a can therefore be greater than a downward swivelling movement of the right-hand plate element 22b. As a result, for example, more air can be released from the right-hand air chamber 16b than is pumped into the left-hand air chamber 16a. Or vice versa.

The inclination sensor device 26 and the associated control device 27 are only shown schematically.

The two pipes 10a and 10b for the air supply and exhaust flows are connected to a valve device 23, which in turn is connected to a pump 25 via a main air pipe 24.

<table><tr><td>7</td><td>8</td></tr></table>

LIST OF REFERENCE SIGNS

1 Vehicle seat
2 Seat part
2a Seat cushion part
3 Backrest
4 Armrest
5 Gaiter
6 Turntable
7 Swivelling axis
8 Seat plate part
9 Plate element
10a Pipe
10b Pipe
11 Air-conveying pump
12 Air pipe
13 Control device
14 Inclination sensor device
15 Swivelling axis
15a Centre axis
16 Fluid chamber unit
16a Fluid chamber unit
16b Fluid chamber unit
17 Base element
18a Recess
18b Recess
19a Fluid chamber unit
19b Fluid chamber unit
19c Fluid chamber unit
19d Fluid chamber unit
20 Fluid chamber unit
20a Fluid chamber unit
20b Fluid chamber unit
20c Fluid chamber unit
20d Fluid chamber unit
21 Compensatory position
22 Compensatory position
22a First plate element
22b Second plate element
23 Wheel element
24 Main air pipe
25 Pump
26 Axle
27 Upward swivelling movement

What is claimed is:

1. A vehicle seat for automatic inclination compensation, comprising a seat part and a backrest,
wherein a fluid chamber unit with at least two flexibly designed fluid chambers is arranged between at least one seat plate part of the seat part and a there-above arranged seat cushion part of the seat part,
wherein in relation to a center axis extending in the sitting direction, a first half of the fluid chambers are arranged on a left side and a second half of the fluid chambers are arranged on a right side of the center axis,
wherein the first and second halves of the fluid chambers can be filled or emptied by means of a control device in dependence on a detected lateral inclined position of the seat part in such a way that a seat user automatically experiences a compensatory position in relation to the inclined position in the seat part independently of a backrest position,
wherein at least one first plate element is arranged on the left side and at least one second plate element is arranged on the right side between the fluid chambers and the seat cushion part arranged thereabove, in order to obtain a more stable supporting seat surface for the seat user, and
wherein the at least one first and second plate elements each have a left-hand and a right-hand surface extension with respect to the center axis, which is not smaller than the surface extension of the fluid chambers arranged below and on the left-hand or right-hand side.

2. The vehicle seat according to claim 1, wherein an inclination sensor unit is attached to the vehicle seat, which measures a degree of the current lateral inclination of the vehicle seat and/or of the vehicle and sends an inclination measurement signal to the control device.

3. The vehicle seat according to claim 1, wherein the fluid chambers are air chambers.

4. The vehicle seat according to claim 3, wherein a plurality of air chambers is arranged on the left and right sides of the centre-center axis.

5. The vehicle seat according to claim 1, wherein the first and second plate elements have raised and recessed areas to increase the seating comfort.

6. The vehicle seat according to claim 1, wherein the first and second plate elements are mounted so as to be able to swivel up and down by means of a first swivelling axis running along the center axis of the seat part.

7. The vehicle seat according to claim 1, wherein the first and second plate elements can be swivelled independently of one another.

8. The vehicle seat according to claim 1, wherein a third plate element common to all fluid chambers is arranged between the fluid chambers arranged next to one another and the seat cushion part arranged above them, which plate element is mounted in a rocker-like manner by means of a second swivelling axis running along the center axis of the seat part.

9. The vehicle seat according to claim 1, wherein the control device can be activated at predetermined speed values and/or acceleration values of the vehicle.

* * * * *